United States Patent
Chaine et al.

(10) Patent No.: US 8,195,804 B1
(45) Date of Patent: *Jun. 5, 2012

(54) OPTIMIZING WEBSITE TRAFFIC AMONG CONTENT SOURCES

(75) Inventors: Olivier Antoine Chaine, Los Angeles, CA (US); Scott A. Riley, Bourbonnais, IL (US); Rocky Kitamura, Playa Del Rey, CA (US)

(73) Assignee: magnify360, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,848

(22) Filed: Dec. 6, 2011

Related U.S. Application Data

(63) Continuation of application No. 13/223,024, filed on Aug. 31, 2011, now Pat. No. 8,090,835.

(51) Int. Cl.
*G06F 15/173* (2006.01)
(52) U.S. Cl. .......................................... 709/226; 725/4
(58) Field of Classification Search .................. 709/226
See application file for complete search history.

(56) References Cited

U.S. PATENT DOCUMENTS

| | | | |
|---|---|---|---|
| 6,671,711 | B1 | 12/2003 | Pirolli et al. |
| 7,376,550 | B1 | 5/2008 | Bokaemper et al. |
| 7,519,705 | B1 | 4/2009 | Papagiannaki et al. |
| 2011/0196690 | A1 | 8/2011 | Peles et al. |

FOREIGN PATENT DOCUMENTS

EP 0798898 A2 10/1997

OTHER PUBLICATIONS

U.S. Appl. No. 13/223,024, filed Aug. 31, 2011, Chaine et al.
Lead Generation Tool From Ceonex Provides Marketing Boost for Publishers; Leadix Increases Revenue Opportunities, Manages Traffic, Business Wire, Oct. 18, 2004.

*Primary Examiner* — Kyung H Shin
(74) *Attorney, Agent, or Firm* — Mintz, Levin, Cohn, Ferris, Glovsky and Popeo, P.C.

(57) ABSTRACT

Systems and methods are provided in which performance is simulated for each of a plurality of traffic allocation models during each of a plurality of historical time segments to obtain a performance metric for each time segment. Thereafter, an allocation value is calculated for each model based on the performance metrics. Once the allocation value has been established for the models, allocations are auctioned among the plurality of models during a plurality of auction rounds. These auctioned allocations are used to determine traffic allocation probabilities among the plurality of model so that traffic can be served on at least one website according to models corresponding to the determined traffic allocation probabilities. Related apparatus, systems, techniques and articles are also described.

18 Claims, 4 Drawing Sheets

OPTIMIZING WEBSITE TRAFFIC AMONG CONTENT SOURCES

CROSS REFERENCE TO RELATED APPLICATIONS

The present application claims priority under 35 U.S.C. §120 to U.S. application Ser. No. 13/223,024, filed Aug. 31, 2011, entitled OPTIMIZING WEBSITE TRAFFIC AMONG CONTENT SOURCES, the disclosure of which is incorporated herein by reference

TECHNICAL FIELD

The subject matter described herein relates to a recombinant training and bidding platform for optimizing online traffic among a plurality of content sources.

BACKGROUND

Websites are increasingly providing different experiences for users in an effort to increase conversion rates with regard to various offerings. For example, A-B testing is often employed in which a portion of users are directed to a baseline webpage while other users are directed to different web pages. The results of these traffic diversions are used to identify web pages that are more likely to result in a particular response. While such an arrangements can provide enhanced conversion rates, such testing rarely results in an optimal allocation because the selection process of sample web pages typically employs arbitrary and/or human driven decisions.

SUMMARY

In one aspect, systems and methods are provided in which performance is simulated for each of a plurality of traffic allocation models during each of a plurality of historical time segments to obtain a performance metric for each time segment. Each performance metric characterizes a number of simulated response events occurring within the corresponding time segment. Thereafter, an allocation value is calculated for each model based on the performance metrics. In some implementations, the allocation value differently weighs at least two of the time segments. Once the allocation value has been established for the models, allocations are auctioned among the plurality of models during a plurality of auction rounds. Each model has an initial bidding value based on the corresponding allocation value which is reduced upon each winning bid in each auction round. These auctioned allocations are used to determine traffic allocation probabilities among the plurality of model so that traffic can be served on at least one website according to models corresponding to the determined traffic allocation probabilities.

The serving traffic can comprise include calculating a best allocation among the winning bids of the auctioned allocations by estimating how the corresponding model would have performed for a pre-determined historical time segment such that the traffic is served using the model having the best allocation.

The performance metric can be any of a variety of data measures which characterize relative performance of a model such as conversion rate, revenue per visitor, and the like.

In some implementations, a portion of the auctioned allocations are randomly selected. Such a random selection can be useful in earlier identifying performance swings with particular models. The random selection of auctioned allocations can occur periodically after a pre-defined number of auction rounds (e.g., every nth round, etc.).

A source-sink-conversion probability can be generated for each model by multiplying the performance metric with pre-determined transition probabilities. Thereafter, the traffic allocation probabilities can be modified based on the generated source-sink-conversion probabilities. Association rule mining can be employed to identify characteristics of visitors resulting in higher performance metrics such that the traffic allocation probabilities can be modified based on the identified characteristics.

At least one predictive model can be used to identify characteristics of visitors resulting in higher performance metrics so that the traffic allocation probabilities are modified based on the identified characteristics. The predictive model can comprise a neural network or a support vector machine trained using historical data from a population of users.

Various types of content/user experiences can be presented to a user in response to the traffic allocation. In some implementations, the models correspond to microsites which in turn can comprise audio and/or visual content encapsulated within a web page.

Additional models can be automatically generated based on the traffic allocation and the performance metrics. In some cases, it can be determined that a model to be served will underperform—and in such cases, the determined model is prevented from being served. The determination of underperformance can be relative to a tunable threshold based on historical performance of a control model.

In an interrelated aspect, systems and methods are provided in which, performance is simulated for each of a plurality of models during each of a plurality of historical time segments to obtain a performance metric for each time segment. Each performance metric characterizes a number of simulated response events occurring within the corresponding time segment. An allocation value can then be calculated for each model based on the performance metrics. Thereafter, allocations can be auctioned among the plurality of models during a plurality of auction rounds with each model having an initial bidding value based on the corresponding allocation value which is reduced upon each winning bid in each auction round. These auctioned allocations are then used to determine initial traffic allocation probabilities among the plurality of models. The initial traffic allocation probabilities are then modified using campaign-specific historical performance data (which may be particular to a specific model or applicable to a plurality of models and/or which can be particular to visitors with certain characteristics). Traffic is then served on at least one website according to models corresponding to the modified traffic allocation probabilities.

In an interrelated aspect, a computer implemented system is provided that includes a bidding engine, a synthesizer and a serving engine. The bidding engine simulates, for each of a plurality of traffic allocation models, performance during each of a plurality of historical time segments to obtain a performance metric for each time segment (with each performance metric characterizing a number of simulated response events occurring within the corresponding time segment). The bidding engine also calculates an allocation value for each model based on the performance and auctions allocations among the plurality of models during a plurality of auction rounds. Each model has an initial bidding value based on the corresponding allocation value which is reduced upon each winning bid in each auction round. The auctioned allocations can be used to determine initial traffic allocation probabilities among the plurality of models. The synthesizer modifies the initial traffic allocation probabilities to increase projected performance metrics. The serving engine serves traffic on at least one website according to models corresponding to the modified traffic allocation probabilities.

The subject matter described herein can be implemented in a distributed fashion with two or more data processors distributed among two or more computing systems. In addition, the synthesizer can generate a source-sink-conversion probability for each model by multiplying the performance metric with pre-determined transition probabilities that are used to modify the initial traffic allocation probabilities.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the subject matter described herein provides a platform that allows the progressive optimization of microsite performance by separating the factors that may affect that performance, optimizing each, and then recombining in real time these optimized factors into a new microsite allocation. By using a market-driven tool (a bidding engine), arbitrariness and human decision is removed from allocation decisions. Moreover, the current subject matter is highly sensitive to performance patterns, which can be used either as feedback to form an initial proposed allocation or as training data for an extensible and entirely decoupled set of machine-learning algorithms. The fact that the current subject matter synthesizes the results of these components enables a flexible and elastic degree of algorithmic hybridization that allows iterative experimentation and improvement. In addition to driving actual microsite allocations, the current subject provides copious data with which to enhance microsite design.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
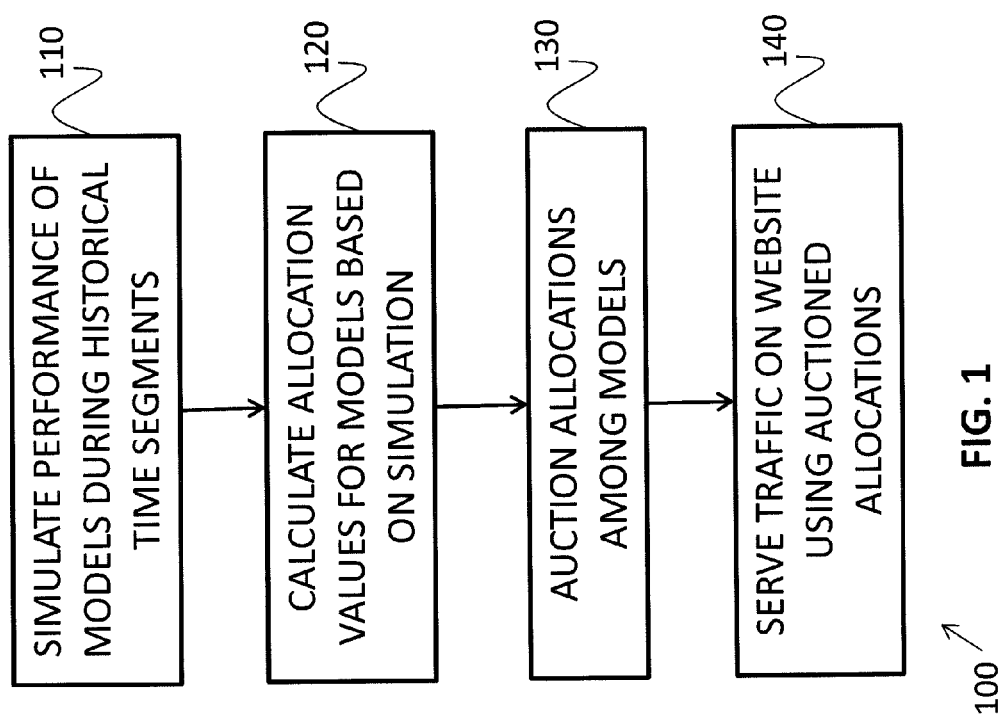
FIG. 1 is a process flow diagram illustrating a first method for optimizing web traffic among content sources.
Figure 2:
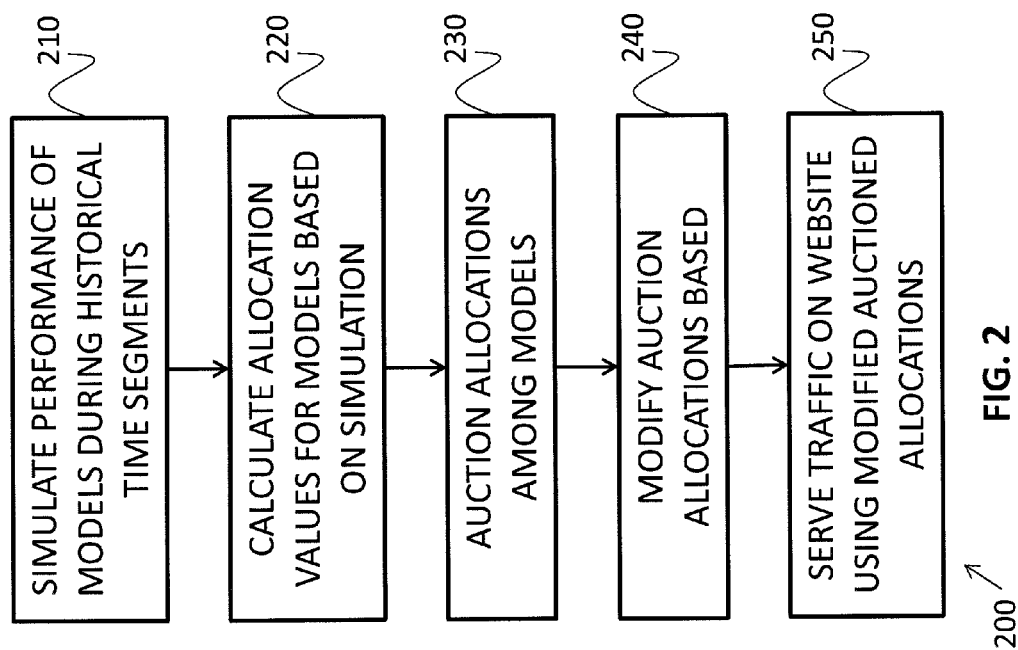
FIG. 2 is a process flow diagram illustrating a second method for optimizing web traffic among content sources.

FIG. 1 is a process flow diagram 100 illustrating a method in which, at 110, performance is simulated for each of a plurality of traffic allocation models. The performance is simulated during each of a plurality of historical time segments to obtain a performance metric for each time segment. Each performance metric characterizes a number of simulated response events occurring within the corresponding time segment. Thereafter, at 120, an allocation value is calculated for each model based on the performance metrics. In some implementations, the allocation value differently weights at least two of the time segments. Once the allocation values have been established, allocations are auctioned, at 130, among the plurality of models during a plurality of auction rounds. Each model has an initial bidding value based on the corresponding allocation value which is reduced upon each winning bid in each auction round. These auctioned allocations are then used to determine traffic allocation probabilities among the plurality of models. Subsequently, at 140, traffic is served on at least one website according to models corresponding to the determined traffic allocation probabilities. In some implementations, initial traffic allocation probabilities can be modified using campaign-specific historical performance data such that traffic is served on at least one website according to models corresponding to the modified traffic allocation probabilities.

The current subject matter is directed to the selective allocation of traffic to various types of content (which are characterized by corresponding models). Various types of content can be delivered to user traffic according to the current subject matter. For illustrative purposes, some of the examples described herein refer to microsites, which in turn, refer to audio and/or visual information encapsulated within a website. In order to effect optimizing website traffic allocation, an optimization agent can be used to select what among various choices of content (i.e., HTML, etc.) should be displayed to a user.

The current subject matter exploits two phenomena identified by the inventors. First, the likelihood of a random visitor to a web page committing a transaction thereon (i.e., a "conversion") is a variable ultimately dependent on many other independent variables, known and unknown, including the structure, appearance, and style of the web content he or she is viewing, as well as contextual variables such as local time of day, visitor location, referring address, and so on. Second, The aggregate conduct of all or identifiable classes of visitors to the particular web page will behave in a way that can be mathematically modeled in such a way as to generate an optimal allocation of web content among those visitors.

In other words, as a starting point, one can conceptualize the problem such that, for every visitor class to any web site, there exists an optimizing formula of arbitrary complexity that, if known, would result in an optimal allocation of web content to that visitor class. Proof of the existence of such a formula follows from the settled notion that for every phenomenon describable in numerical terms, there is at least one equation (or system of equations) that comes closest to the idealized "perfect" equation.

Given the current limitations on computational resources, both globally and within the grasp of any single enterprise, the task of finding this one ideal formula is not a feasible undertaking. This is especially true when one conceives the web as a dynamic, evolutionary, and chaotic system in which the entry of a single new visitor, or the emergence of some social fact, can marginally change the equation. Indeed, this conceptualization of the web is the only proper one.

The web has hundreds of millions of actors committing billions of web transactions each day (as referenced herein a 'transaction' need not be the purchase of an item or filling out a form; it can be something as simple as clicking on a link, posting something to Twitter, or bookmarking a page, etc.). And to make matters even more complicated, all of this activity has near-immediate connectivity because the web is fundamentally social. If someone posts a comment on FACE-BOOK, or makes a purchase on AMAZON, what the next person sees on those pages will differ from what the last person saw. By the same token, each visitor to any ranked page in GOOGLE's search engine will, as a matter of fact, help determine what the rank will be tomorrow. Taken together, this "information cascade" will affect the aggregate behavior and "change the formula."

So, if hunting for the idealized optimizing formula, and then allocating web content with it, is futile, one is left with searching heuristically for a "good" formula. "Good" is defined here as simply "something that is (a) better than randomly allocated pages and (b) better than anything else done so far." The job of searching for, and actualizing, the "good" formula with which to allocate microsites is what is enabled by the current subject matter.

Equation Marketplace. As one does not know even all the variables involved in the "good formula," let alone coefficients and constants, a situation is faced in which one must first apply his or her incomplete understanding of what drives web performance and propose possible arrangements of variables and coefficients and constants within the whole of the possible solution space, and then implement an objective means to measure the success of those proposed formulas against actual performance and, most importantly, iteratively reconfigure the variables and coefficients to move ever closer to the "ideal" formula.

An example will illustrate what this means. Suppose it is proposed that performance for a microsite follows a trend. On a graph, this trend might be depicted as a sine or sawtooth wave in which the performance for the microsite ebbs and flows with respect to time. In such a proposal a very simple modeling technique may be as follows:

1. Establish the recent window of time to analyze.
2. Divide that window in discrete periods.
3. Weight the periods differently such that more attention is paid to the most recent periods.

Suppose there are four periods {a, b, c, d}, where a is the most recent. This technique may result in the formula:

$$w=4a+3b+2c+d$$

where w is the weight given to that web content's performance. The w factor can be either a conversion rate, revenue per visitor, or some other derivative measure.

Obviously, this particular formula has a bias in that it assumes a continuing upward trend in performance. By the same token, this formula, $w=a+2b+3c+4d$, would assume a different path or position on the performance curve in that it would assign the most weight to the performance found three periods before the most recent one.

These are simple examples. In practice, more complicated formulas would include polynomial or linear transformation modeling of performance weights. The possibilities are endless because the permutations of variables and coefficients are incalculable. Because they are endless, the current subject matter, in some implementations, is agnostic about which equations are best. This is a key feature of the current subject matter (i.e., the current system follows performance). The current subject matter does not attempt to predetermine outcomes to fit with a theory of web behavior. In fact, it assumes there is no good theory of web performance—and certainly none which would apply to every situation and client. It is, in other words, a device to find progressively larger performance yields.

Figure 3:
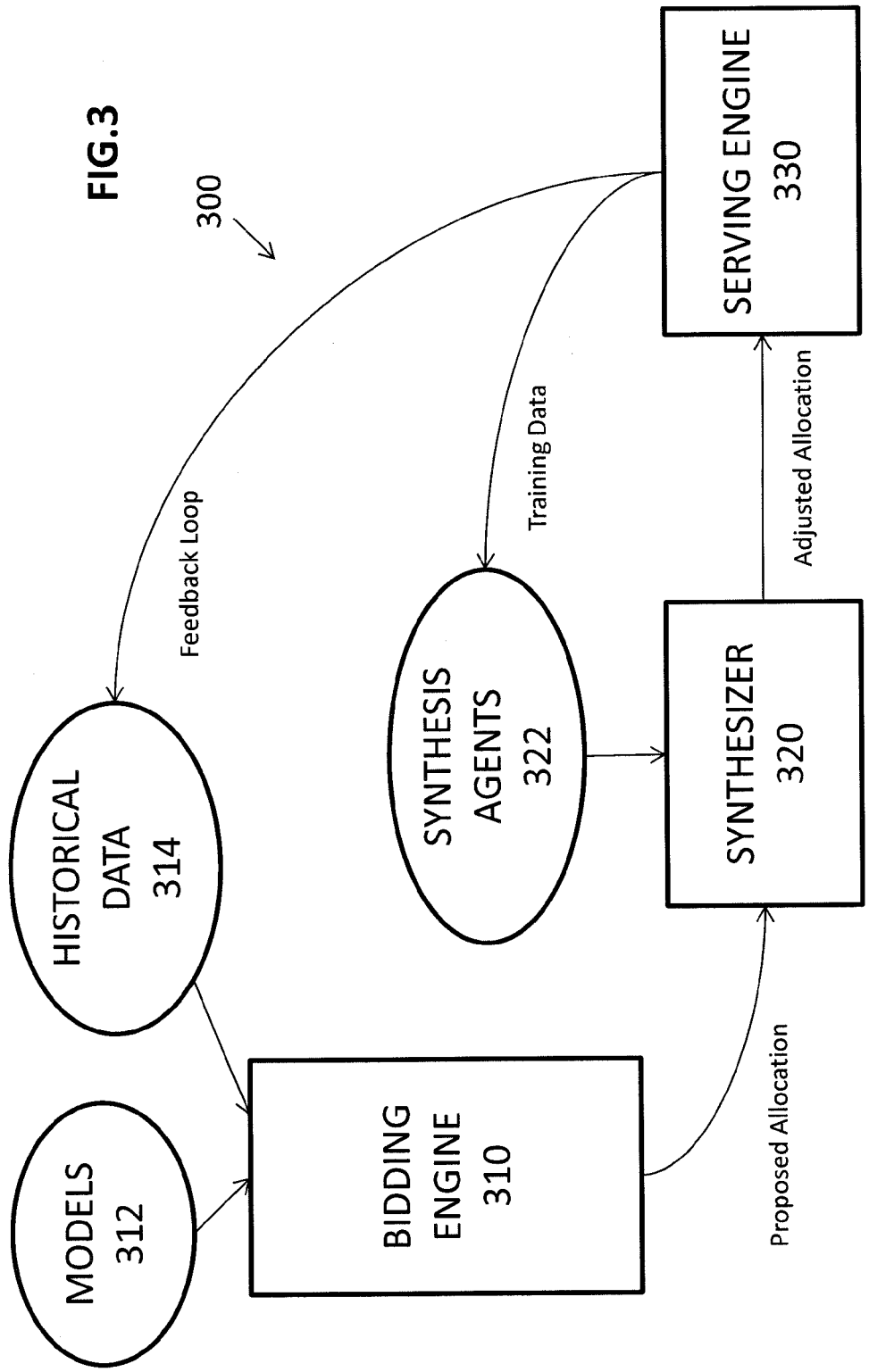
FIG. 3 is a diagram illustrating a system for optimizing web traffic among content sources including a bidding engine, a synthesizer, and a serving engine.

FIG. 3 is a diagram 300 illustrating a system with three main components a bidding engine 310, a synthesizer 320, and a serving engine 330. As is illustrated, the bidding engine 310 receives, as input, various models and in some cases historical data and/or feedback from the serving engine 330. The synthesizer 320 is coupled to the bidding engine 310 which sends the synthesizer 320 one or more proposed allocations. The synthesizer 320 can utilize one or more synthesis agents 322 which in turn can utilize data relating to source/transition probabilities, website visitor features, genetic algorithms and the like. The synthesis agents 322 in some cases can use historical data from the serving engine 330 for training purposes. The output of the synthesizer 320 can be an adjusted allocation (or it can be the original proposed allocation from the bidding engine 310) which is used by the serving engine 330 to serve various models (e.g., forms of contents, etc.) to visitors of a website (i.e., website traffic, etc.). Further details regarding these components are described below.

Bidding Engine. In practice, anywhere from several hundred to several hundreds of thousands of competing equations, or models, will compete in an attempt to "purchase" as much of the traffic allocation as possible. Each will present its "w" value. This value is a principal input to the bidding engine 310, which can initiate a two-fold procedure to establish a "recommended microsite allocation." The first part of this procedure can be to use the "w" value from each model to propose an allocation. The second part can be to take all these proposed allocations and calculating, from actual performance data, how each model would have fared in the last time period if that allocation had been in effect during that time period. The length of the time period is arbitrary. It can be a week, a day, an hour, or a minute. The determinative factors for the length of the time period are volume of traffic and the extent of available computational resources.

Since this time period is generally the most recent, the idea is that this allocation scheme will inevitably and autonomously bias, without human intervention, more traffic toward the microsite with the better instantaneous performance, rather than inefficiently focusing on the microsite with the better average performance. The details for this procedure follow.

This w value is used to assign an opening value to each microsite. This opening value is transformed into a relative valuation denominated in dollars and cents. The valuation represents the purchasing power of each microsite as it comes to the auction. At this point an auction begins, which is described in general terms by this pseudocode:

```
Allocation = { }
BiddingMicrosites = {A, B, C....}
For 1 to n:
    highBidder = Null
    highBid = 0
    If DORANDOMSELECTION == True:
        highBidder = GETRANDOM( BiddingMicrosites )
    Else:
        if Microsite->getBid( ) > highBid:
            highBid = Microsite->getBid( )
            highBidder = Microsite
    Allocation[highBidder->getID( )] += 1
    REDUCEBIDDINGPOTENTIAL(highBidder->getID( ), highBid)
```

Where n is the number of auction rounds to run (typically 500).

The outcome of this auction is a hash map of allocation proportions. So, if there are four microsites in the auction, an allocation hash map may look like this:

Microsite1: 356
Microsite2: 72

Microsite3: 60

Microsite4: 12

This allocation, of course, is simply a representation of the probability at which microsite should be served.

In some implementations, the current algorithms can incorporate random selection (e.g., DoRandomSelection method, etc.). Each model can contain a random factor so that for every nth auction round, the round winner (i.e., the microsite getting that part of the allocation) is chosen by random means. The random element ensures that even a very-low-performing microsite will obtain some visitors and this fact will make it possible to detect changes in performance. If the system did not have this stochastic feature, it would almost certainly miss (or be much slower to detect) performance swings. The occasional stochastic allocation also makes the system nimble enough to shift allocations to a radical degree each time period, if the performance data indicates it should do so.

Another important feature part of the current algorithms include a bidding component (e.g., ReduceBiddingPotential method, etc.). When a microsite wins an auction round, it must pay for its "purchase." Payment reduces the microsite's "pocket money," which is the amount of money left to bid on subsequent auction rounds. This "spend down" has the effect of eventually equalizing the leading microsite with the others. Typically, the leading microsite may win the first 100 or 200 auction rounds, and then trade round wins with the other microsites after the leading microsite for the duration of the auction. This process provides a rational, price-based mechanism (or market) for the relative performance magnitudes of the respective microsites to reach a mutual equilibrium. The effect of reaching that equilibrium will be an allocation in which the leader (or leaders) deservedly dominate the allocation, but not overwhelm it. This is critical. After all, if one accepts the premise that relative microsite performance does can and does rapidly shift, preventing the complete dominance of one microsite in a given time period also prevents an overdetermined result.

Described above is the process for generating a set of proposed allocations. Each model generates an allocation. If there are 10,000 models, one would have 10,000 proposed allocations. Selecting the best one is the second main task of the bidding engine 310.

This selection process requires review of recent performance for each microsite (over a window of time of tunable length), calculate the actual result had each of the proposed allocations been allocated, and then selecting that allocation which would have generated the best result based on the actual performance. An example "run" in Table 1 below illustrates this process.

TABLE 1

| Time Period | Best Model Allocation (used for serving microsites) | Result (conversion rate in percent) based on the "best model's" total performance to date |
| --- | --- | --- |
| 1 | Model X | 10.2 |
| 2 | Model X | 10.6 |
| 3 | Model Y | 10.8 |
| 4 | Model X | 10.7 |
| ... | | |
| 57 | Model Z | 11.4 |

In this simplified example, it is possible to get an idea how the stable of models will compete, not only within each time period's auction "tournament," but over time has well. This is another important aspect of the current subject matter, which leads to the next section of this discussion.

Figure 4:
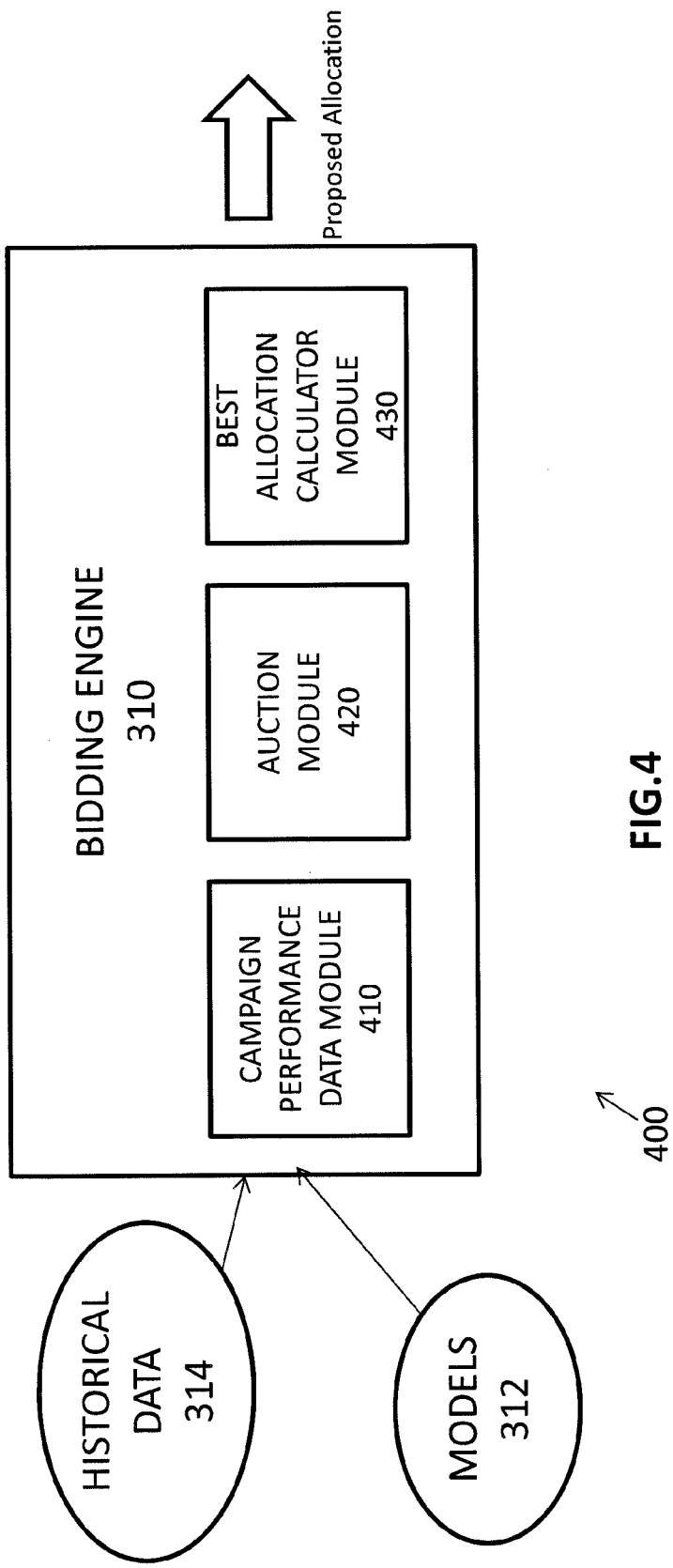
FIG. 4 is a diagram illustrating data consumed and generated by the bidding engine.

FIG. 4 is a diagram 400 illustrating one implementation of a bidding engine 310 including a campaign performance data module 410, an auction module 420, and a best allocation calculator module 430. In this arrangement, the bidding engine 310 receives various models 312 as well as historical data 314 (e.g., past performance data, etc.). The campaign performance data module 410 using this data makes an initial bidding potential for each model (i.e., the allocation values). Thereafter, the auction module 420 conducts one or more auctions based on the determined bidding potentials to result in an allocation set. This allocation set in some instances can be modified by the best allocation calculator module 430 which optimizes the allocations based on a variety of criteria.

Feedback and Learning. The current subject is adaptive in that it has the capacity to learn. As it generates allocations, and those allocations are served over the course of many time periods, the performance of those allocations will provide signals to the next round of allocations (the main signal being the "w" value determined in the bidding engine 310). If the allocations were productive of superior performance, the system would be biased toward repeating them in subsequent time periods. If the allocations were not so productive, the system would create the opposite bias and radically alter the allocations in the next time period(s). At all times, it will be sensitive, not to a predetermined theory of a "proper" micro site allocation, but to the movement of performance data in real time.

Moreover, since the total performance of the best model to date is taken into account, the system is naturally listening to, and acting upon, the signals generated by the allocations up to that point. Thus, over time, a slow convergence to the best model overall can be expected (this convergence will never be complete as performance patterns will constantly change; however, the system will continue to converge toward the optimal performance).

At this junction it's important to point out that the "best model" may not necessarily be a single mathematical model. In practice, it will be a small subset of all models that essentially cluster as the nearest neighbors to the unknowable ideal model and the best possible performance.

Synthesizer The above referenced components deal with the relationship between past performance and traffic allocation. Those components have done their computations and arrived at a "best model" of the performance curve. This is merely the first part of the current system, and the product of that first part is recombined with the factors developed in the second.

The second part, called the synthesizer 320, transforms the proposed allocation by the application of one or more algorithms that take into account instance-specific data. One example, among very many, is the use of transition probabilities. A description of how the current system uses this information to synthesize a new allocation follows.

The current subject matter utilizes the source-sink (referrer-target) patterns of the visitors to whom content is served. Information relating to user travel over web links can be an important aspect to efficiently monetize traffic (i.e., allocate traffic to various content, etc.).

The travels of the multiplicity of visitors over the Internet leads to the creation of a web graph: a set of nodes connected by directed edges. These data points may be symbolically expressed as follows:

$$A\text{->}B\text{->}C$$

This is one sequence of web page hops from A to B, then from B to C. A is the source relative to B, and B is the source relative to C. In turn, B is the sink relative to A, and C is the sink relative to B. The edges between each node may be weighted with a ratio, where the denominator is the total number of visitors that appeared at the source and the numerator is the number of visitors who followed the edge to the sink. So, using the example above, if 102 people appeared at A and 21 followed the edge from A to B, then this ratio would be 21/102. This ratio is known as a Markov chain transition probability.

If there are two sources (S and T) and three microsites (X, Y, Z), and the transition probabilities would be calculated as provided in Table 2.

TABLE 2

|   | S   | T   |
|---|-----|-----|
| X | 2/9 | 1/9 |
| Y | 1/3 | 2/9 |
| Z | 4/9 | 2/3 |

Suppose further that the conversion rates of X, Y, and Z are calculated as 0.25, 0.1, and 0.05, respectively.

Thus, these conversion rates can be multiplied across transition probabilities to derive a new metric: source-sink-conversion probability as provided in Table 3.

TABLE 3

|   | S | T |
|---|---|---|
| X | $2/9 * 1/4 = 2/36$ or $0.0556$ | $1/9 * 1/4 = 1/36 = 0.0278$ |
| Y | $1/3 * 1/10 = 1/30 = 0.0333$ | $2/9 * 1/10 = 2/90 = 0.0222$ |
| Z | $4/9 * 1/20 = 4/180 = 0.0222$ | $2/3 * 1/20 = 2/60 = 0.0333$ |

As data such as this is obtained, crucial intelligence is acquired that can be actionable in (at least) three ways:
1. The client should be advised to drive as much traffic as possible to S.
2. X could be served "heavily" if the source is S.
3. Z would be predominantly served when the source is T.

The synthesizer 320, in real time, can modify the allocation in several ways. The following is one example:
1. Computes a coefficient expressed in the fraction, A/B, where:
A is the probability of the edge (source and microsite) travelled by the instant visitor.
B is the mean of all such probabilities for that microsite. That is, B is the mean of the transition probability for every edge into that microsite.
2. Raise this fraction by an exponent in order to enhance the value. This final value can be called C.
3. Use this C to modify the traffic allocation of the campaign.

An example of this modification: If, for a given source, microsite X has a C has 2.18, the probability of serving X would be adjusted by some factor based on C. With this boost, over the course of several hours and days, if X continues to have a dominant C, it would come to get most of the traffic from that source—as it should since a dominant C means it is the most productive sink or destination for that source.

It is useful to bear in mind that the foregoing describes only one synthesizer agent 322. Many more of varying complexity are possible. In fact, any number of agents may be used. For example, the synthesizer 320 can employ Association Rule Mining to find characteristics of visitors (such as location, browser type) that map to landing page conversion rates, and once these associations are learned, the landing pages can be ranked by rule sets. For example, if there is a rule set {B, D, G} that, if present, associates with a much higher conversion rate on microsite X versus all the others, the allocation would be transformed/modified for that visitor class. If the association rules are valid, this will usually (if not inevitably) lead to superior performance. All synthesizer agents 322 can be constant time in operation such that they require significant offline preprocessing.

Genetic Algorithms and other advanced Synthesizer algorithms. The current techniques will create and consume very large amounts of data. The monthly computations alone can, for any significant number of microsite campaigns and models, involve tens of millions of database rows. Moreover, the performance waves through this data may become difficult to detect using a non-heuristic or deterministic approach. Accordingly, a key element of the synthesizer 320 is the capacity to use heuristic procedures to detect and exploit hidden patterns in the performance data.

One such procedure is Genetic Algorithms (GA), which are essentially a technique to search a large solution space with a set of starting formulas and then "mutating" their operators, coefficients, or constants based on feedback that rewards those mutations that result in improved formulas (better 'fitness') and punishing those that do not. The mechanism for mutation is either random alterations in a single formula or random combination of elements of two other formulas. Over time the 'population' of formulas will gravitate towards better fitness.

The application that GA have to the current subject matter is two-fold: using the prior results of campaigns under RTB, GA will be useful in suggesting new models and, more importantly, in the synthesizer agent 322 GA can detect modifiers that the synthesizer 320 can consult on the fly to change allocations.

Neural networks can also be the basis for an advanced algorithm in the synthesizer 320. The key characteristic of a neural network is the ability to discover a complex and obscure relationship between input and output data. In practice, this sort of machine learning would be unsupervised and the neural network would use as continuous training data the results of prior microsite allocations as the primary function. The synthesizer 320 can accommodate more than one type of neural network (i.e., Boltzmann, bi-directional, feedforward).

These are just two examples of advanced learning agents for the synthesizer 320. The synthesizer 320 itself is agnostic about particular forms of algorithm, creating a "plug-and-play" design that fosters progressive experimentation and improvement against known results.

Serving Engine. The final piece of the current subject matter is the serving engine 330. The chief feature of this component is the implementation of so-called "guardrails" that will detect and override a proposed microsite allocation that is predicted or likely to underperform some tunable threshold (e.g., historical performance of the 'control' microsite). In addition, in some implementations, a median serving time of 100 milliseconds or less is maintained.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method for implementation by one or more processors comprising:
    simulating, by at least one processor, for each of a plurality of traffic allocation models, performance during each of a plurality of historical time segments to obtain a performance metric for each time segment, each performance metric characterizing a number of simulated response events occurring within the corresponding time segment;
    calculating, by at least one processor, an allocation value for each model based on
        (i) the performance metrics and
        (ii) a source-sink-conversion probability for each model, the source-sink-conversion probability being calculated by multiplying the performance metric with pre-determined transition probabilities;
    auctioning, by at least one processor, allocations among the plurality of models during a plurality of auction rounds, each model having an initial bidding value based on the corresponding allocation value which is reduced upon each winning bid in each auction round, the auctioned allocations being used to determine traffic allocation probabilities among the plurality of models; and
    serving, by at least one processor, traffic on at least one website according to models corresponding to the determined traffic allocation probabilities.

2. A method as in claim 1, wherein the serving traffic comprises:
    calculating, by at least one processor, a best allocation among the winning bids of the auctioned allocations by estimating how the corresponding model would have performed for a pre-determined historical time segment;
    wherein the traffic is served using the model having the best allocation.

3. A method as in claim 1, wherein the performance metric is a conversion rate using the corresponding model.

4. A method as in claim 1, wherein the performance metric is based on revenue per visitor using the corresponding model.

5. A method as in claim 1, wherein at least a portion of the auctioned allocations are randomly selected.

6. A method as in claim 5, wherein the random selection of auctioned allocations occurs periodically after a pre-defined number of auction rounds.

7. A method as in claim 1, further comprising:
    employing, by at least one processor, association rule mining to identify characteristics of visitors resulting in higher performance metrics; and
    modifying, by at least one processor, the traffic allocation probabilities based on the identified characteristics.

8. A method as in claim 1, further comprising:
    using, by at least one processor, at least one predictive model to identify characteristics of visitors resulting in higher performance metrics; and
    modifying, by at least one processor, the traffic allocation probabilities based on the identified characteristics.

9. A method as in claim 8, wherein the at least one predictive model is a neural network or a support vector machine trained using historical data from a population of users.

10. A method as in claim 1, wherein each model corresponds to a microsite.

11. A method as in claim 10, wherein each microsite comprises content encapsulated within a web page.

12. A method as in claim 1, further comprising:
    generating, by at least one processor, additional models based on the traffic allocation and the performance metrics.

13. A method as in claim 1, further comprising:
    determining, by at least one processor, that a model to be served will underperform; and
    preventing, by at least one processor, the determined model from being served.

14. A method as in claim 13, wherein model is determined to underperform relative to a tunable threshold based on historical performance of a control model.

15. A computer-implemented method comprising:
    simulating, by at least one processor for each of a plurality of traffic allocation models, performance during each of a plurality of historical time segments to obtain a performance metric for each time segment, each performance metric characterizing a number of simulated response events occurring within the corresponding time segment;

calculating, by at least one processor, an allocation value for each model based on
  (i) the performance metrics and
  (ii) a source-sink-conversion probability for each model, the source-sink-conversion probability being calculated by multiplying the performance metric with pre-determined transition probabilities;

auctioning, by at least one processor, allocations among the plurality of models during a plurality of auction rounds, each model having an initial bidding value based on the corresponding allocation value which is reduced upon each winning bid in each auction round, the auctioned allocations being used to determine initial traffic allocation probabilities among the plurality of models;

modifying, by at least one processor, the initial traffic allocation probabilities using campaign-specific historical performance data; and serving, by at least one processor, traffic on at least one website according to models corresponding to the modified traffic allocation probabilities.

16. A method as in claim 15, wherein each model comprises a microsite which, when served, comprises content encapsulated within a web page.

17. An article comprising computer executable instructions stored on non-transitory computer readable media, which, when executed by at least one data processor, causes the at least one data processor to implement modules comprising:

a bidding engine to:
  simulate, for each of a plurality of traffic allocation models, performance during each of a plurality of historical time segments to obtain a performance metric for each time segment, each performance metric characterizing a number of simulated response events occurring within the corresponding time segment;
  calculate an allocation value for each model based on the performance;
  auction allocations among the plurality of models during a plurality of auction rounds, each model having an initial bidding value based on the corresponding allocation value which is reduced upon each winning bid in each auction round, the auctioned allocations being used to determine initial traffic allocation probabilities among the plurality of models;

a synthesizer to modify the initial traffic allocation probabilities using generated source-sink-conversion probabilities for each model to increase projected performance metrics, the synthesizer generating a source-sink-conversion probability for each model by multiplying the performance metric with pre-determined transition probabilities; and a serving engine to serve traffic on at least one website according to models corresponding to the modified traffic allocation probabilities.

18. An article as in claim 17, wherein there are two or more data processors distributed among two or more computing systems.

* * * * *